US012734645B2

(12) United States Patent
Bellamy et al.

(10) Patent No.: US 12,734,645 B2
(45) Date of Patent: Sep. 15, 2026

(54) TOOL WITH CHEVRON JAW

(71) Applicants: Phillip Bellamy, Anchorage, AK (US); Kevin Shelver, Anchorage, AK (US)

(72) Inventors: Phillip Bellamy, Anchorage, AK (US); Kevin Shelver, Anchorage, AK (US)

(*) Notice: Subject to any disclaimer, the term of this patent is extended or adjusted under 35 U.S.C. 154(b) by 104 days.

(21) Appl. No.: 19/208,088

(22) Filed: May 14, 2025

(65) Prior Publication Data

US 2026/0200044 A1 Jul. 16, 2026

Related U.S. Application Data

(63) Continuation-in-part of application No. 29/983,529, filed on Jan. 10, 2025, now Pat. No. Des. 1,081,301.

(51) Int. Cl.
*B25B 7/02* (2006.01)
*B25B 7/12* (2006.01)
*B25B 13/50* (2006.01)

(52) U.S. Cl.
CPC ................ *B25B 7/02* (2013.01); *B25B 7/123* (2013.01); *B25B 13/5058* (2013.01)

(58) Field of Classification Search
CPC .... B25B 7/02; B25B 7/04; B25B 7/06; B25B 7/08; B25B 7/10; B25B 7/123; B25B 7/14; B25B 7/18; B25B 7/20; B25B 13/02; B25B 13/10; B25B 13/12; B25B 13/48; B25B 13/50; B25B 13/5058; B25B 13/56; B25B 13/58
See application file for complete search history.

(56) References Cited

U.S. PATENT DOCUMENTS

| | | | | |
|---|---|---|---|---|
| D19,412 | S | 11/1889 | Donahue | |
| 414,799 | A * | 11/1889 | Donahue | B25B 13/46 81/186 |
| D31,142 | S | 7/1899 | Lannon | |
| 2,098,369 | A * | 11/1937 | Baash | B25B 13/505 24/493 |
| 2,760,395 | A * | 8/1956 | St Pierre | B25B 7/02 81/177.1 |
| 2,962,919 | A * | 12/1960 | Grundmann | E21B 19/10 269/283 |
| D314,896 | S | 2/1991 | Haynes | |
| 7,124,786 | B1 * | 10/2006 | Gowhari | H01R 43/033 140/149 |

(Continued)

FOREIGN PATENT DOCUMENTS

| | | |
|---|---|---|
| CN | 202430190661 | 11/2024 |
| WO | EMID000257605 | 2/2005 |
| WO | WO2008101291 A1 | 8/2008 |

OTHER PUBLICATIONS

Semere Maschalu, Pipe Wrench, GrabCAD Community; https://grabcad. com/library/pipe-wrench-87, published Nov. 11, 2023, accessed Jan. 10, 2025.

(Continued)

*Primary Examiner* — Robert J Scruggs
(74) *Attorney, Agent, or Firm* — Patrick D.S. Reed

(57) ABSTRACT

Examples of devices and techniques provide a gripping tool with a chevron tool jaw. In other words, the gripping surface of the jaw of the tool includes a chevron pattern for improved gripping capability. In various embodiments, the chevron gripping pattern may be disposed on one or more jaws of the tool.

20 Claims, 7 Drawing Sheets

(56) References Cited

U.S. PATENT DOCUMENTS

| | | | | |
|---|---|---|---|---|
| 2003/0172781 | A1* | 9/2003 | Saunders | B25B 13/5058 81/119 |
| 2016/0129565 | A1* | 5/2016 | Watson | B25B 7/02 81/185.1 |
| 2016/0184980 | A1* | 6/2016 | Takasaki | B25B 7/02 81/424.5 |
| 2020/0139515 | A1* | 5/2020 | Kuter-Arnebeck | B25B 7/02 |
| 2023/0150096 | A1* | 5/2023 | Blumenthal | B25B 7/04 81/318 |

OTHER PUBLICATIONS

Pushpamal Karunarathna, Pipe Wrench 3D, GrabCAD Community; https://grabcad.com/library/pipe-wrench-3d-1, published Oct. 21, 2018, accessed Jan. 10, 2025.

* cited by examiner

TOOL WITH CHEVRON JAW

CROSS-REFERENCE TO RELATED APPLICATIONS

This application is a continuation-in-part of application Ser. No. 29/983,529, filed Jan. 10, 2025.

BACKGROUND

Hand tools such as pliers, pipe wrenches, and similar gripping instruments are widely used in various mechanical, plumbing, and electrical applications for gripping, turning, bending, or holding objects. These tools typically comprise a pair of handles and jaws connected by a pivot mechanism, allowing manual operation to apply clamping or torsional force to a workpiece.

Conventional pliers and pipe wrenches, while sometimes adequate for some uses, often suffer from several limitations that can impact performance, durability, and user ergonomics. For example, many existing designs have gripping surfaces that can wear prematurely or lack the precision necessary for secure engagement with smooth or irregular surfaces. When the tool slips while attempting to grip a workpiece, the tool, the workpiece, or both can be damaged. In such cases, gripping the workpiece can become even more challenging, exacerbating the problem.

BRIEF DESCRIPTION OF THE DRAWINGS

The detailed description is set forth with reference to the accompanying figures. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Figure 1:
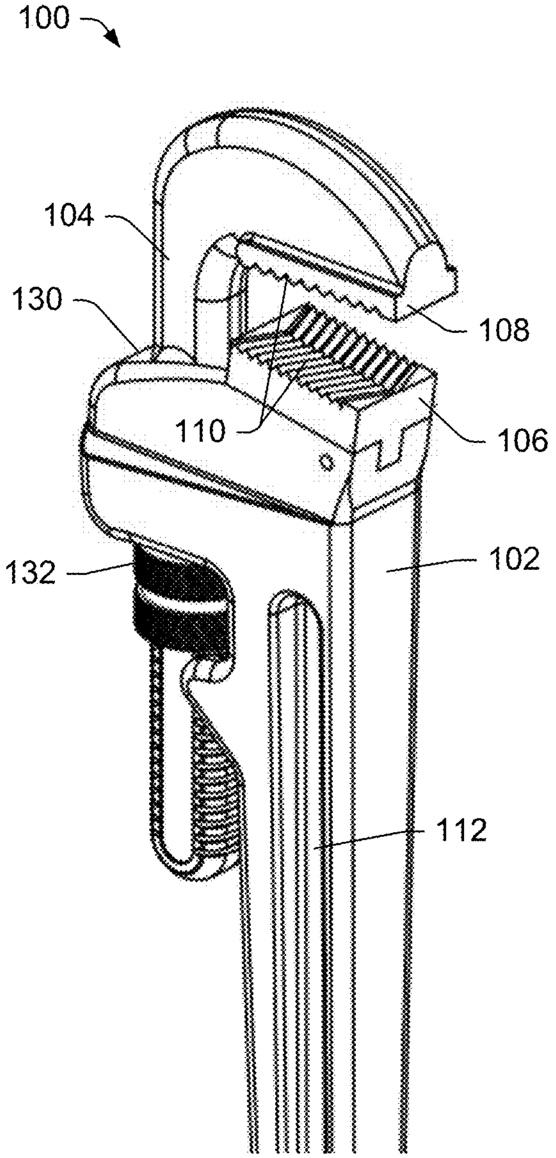
FIGS. 1 and 2 are perspective views of an example tool with chevron jaw, according to an embodiment.

The subject matter of the present disclosure is described with specificity to meet statutory requirements. However, the description itself is not intended to limit the scope of this disclosure. Rather, the claimed or disclosed subject matter might also be embodied in other ways to include different components, steps, or combinations thereof similar to the ones described in this document, in conjunction with other present or future technologies. Terms should not be interpreted as implying any particular order among or between various steps disclosed herein unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Referring to FIGS. 1-12, representative examples of devices and techniques provide a hand tool ("tool 100") arranged for gripping a workpiece and having at least one chevron tool jaw (106, 108). In other words, the gripping surface 110 of the jaw (106, 108) of the tool 100 includes a chevron pattern for improved gripping capability. The gripping surface 110 is comprised of teeth 902 or other like features arranged in a chevron pattern. In various embodiments, the chevron gripping pattern may be disposed on one or more jaws (106, 108) of the tool 100. When the tool 100 includes a chevron pattern on the gripping surface 110 of more than one tool jaw (106, 108), the chevron patterns of the jaws (106, 108) may be alike, or may have some differences. If just one jaw (106, 108) of the tool 100 has a chevron gripping surface, any other jaw (106, 108) of the tool 100 can include a traditional gripping pattern (e.g., a horizontal pattern) a flat gripping surface, or some other gripping surface, such as an irregular pattern, and so forth.

The present disclosure relates to hand tools that are arranged for gripping a workpiece, such as slip-joint pliers, slide-adjustable pliers, locking pliers, pipe wrenches, adjustable wrenches, needle-nose pliers, and so forth. While specific examples are described and illustrated for convenience, all such tools are included within the scope of the disclosure. In each case, the tool 100 comprises at least two primary components, a tool body 102 and a movable tool arm 104, which is movably coupled to the tool body 102. The tool arm 104 may be pivotally coupled, slidably coupled, or some combination of pivotally and slidably coupled to the tool body 102, with or without additional adjustment components (a screw mechanism, for example) or locking components. Additionally, in each case, the tool body 102 includes a first tool jaw 106, which is integral to or rigidly coupled to the tool body 102, and the tool arm 104 includes a second tool jaw 108, which is integral to or rigidly coupled to the tool arm 104. Each of the first 106 and second 108 tool jaws have a gripping surface 110 configured to grip the workpiece, generally when the workpiece is disposed between the two tool jaws (106 and 108).

Figure 2:
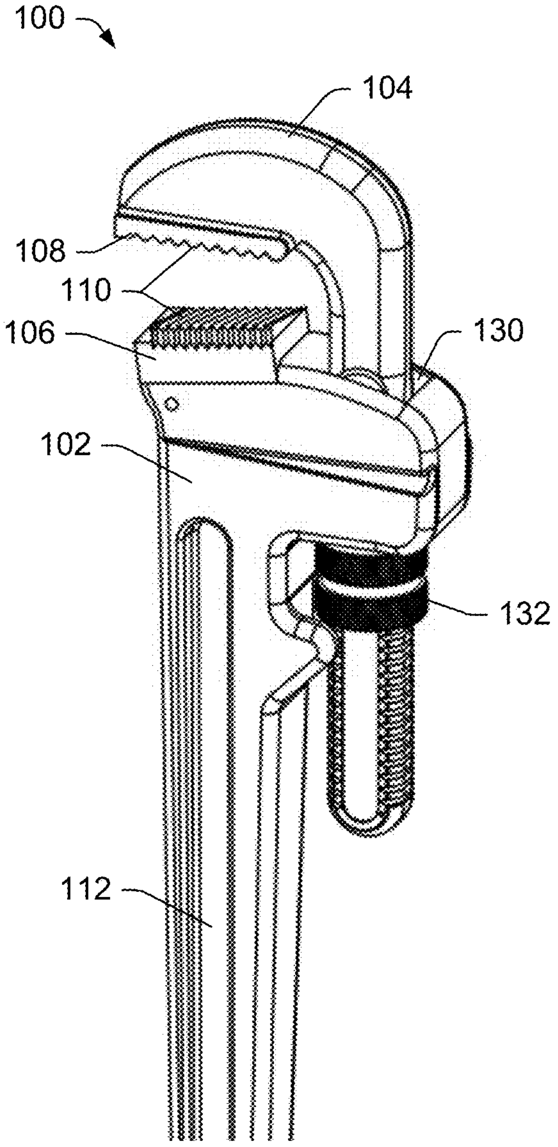

Referring to FIGS. 1 and 2, an example tool 100 is shown in front and back perspective views. The example tool 100 includes a rigid tool body 102 with various features and characteristics that can help the user to make a positive hold on the tool 100. The tool body 102 also includes one or more features and characteristics that promote movement and adjustment of a movable tool arm 104 relative to the tool body 102. Further, the tool body 102 includes a first tool jaw 106 and the movable tool arm 104 includes a second tool jaw 108.

The tool 100 is represented by an example pipe wrench in FIGS. 1 and 2. However, the disclosure and discussion herein also refers to the tools shown at FIGS. 3-5 (e.g., slip-joint pliers), FIGS. 6 and 7 (e.g., adjustable parallel-jaw pliers), and FIGS. 8-10 (e.g., locking pliers), as well as various other tools having similar features and characteristics. In other words, the present disclosure describes any of various tools that have a tool body 102 with a first tool jaw

106 and a movable tool arm 104 with a second tool jaw 108, wherein the movable tool arm 104 is movable or adjustable relative to the tool body 102, and the first (106) and second (108) tool jaws can be used to grip a workpiece.

As shown in the figures, the rigid tool body 102 can include a hand hold 112 (e.g., hand grip, or the like), for facilitating the user holding (and operating) the tool 100. The tool body 102 and/or the hand hold 112 can include a texture, indents, or like features integral to the tool body 102. The hand hold 112 can also include an added grip 502, such as a natural or synthetic rubber handle grip 502, a dipped polymer grip 502, or the like, that can be disposed over a portion of the tool body 102 at the hand hold 112 to improve or facilitate the user's grip on the tool body 102 (see FIGS. 6 and 7, for example). Additional features can include various contours, projections, recesses, and so forth either integral to or added to the tool body 102 at the hand hold 112.

As also shown in the figures, the tool body 102 can include one or more features or characteristics to facilitate movement or adjustment of the movable tool arm 104 relative to the tool body 102. For instance, the example tool 100 of FIGS. 1 and 2 (e.g., a pipe wrench, or the like) includes a channel 130 for the movable tool arm 104 to slide through. The tool body 102 also includes an adjustment nut 132 that is rotated to adjust a position of the movable tool arm 104 within the channel 130. Moving the movable tool arm 104 within the channel 130 brings the second tool jaw 108 closer to the first tool jaw 106 or further away from the first tool jaw 106, for precise gripping of the workpiece.

Figure 3:
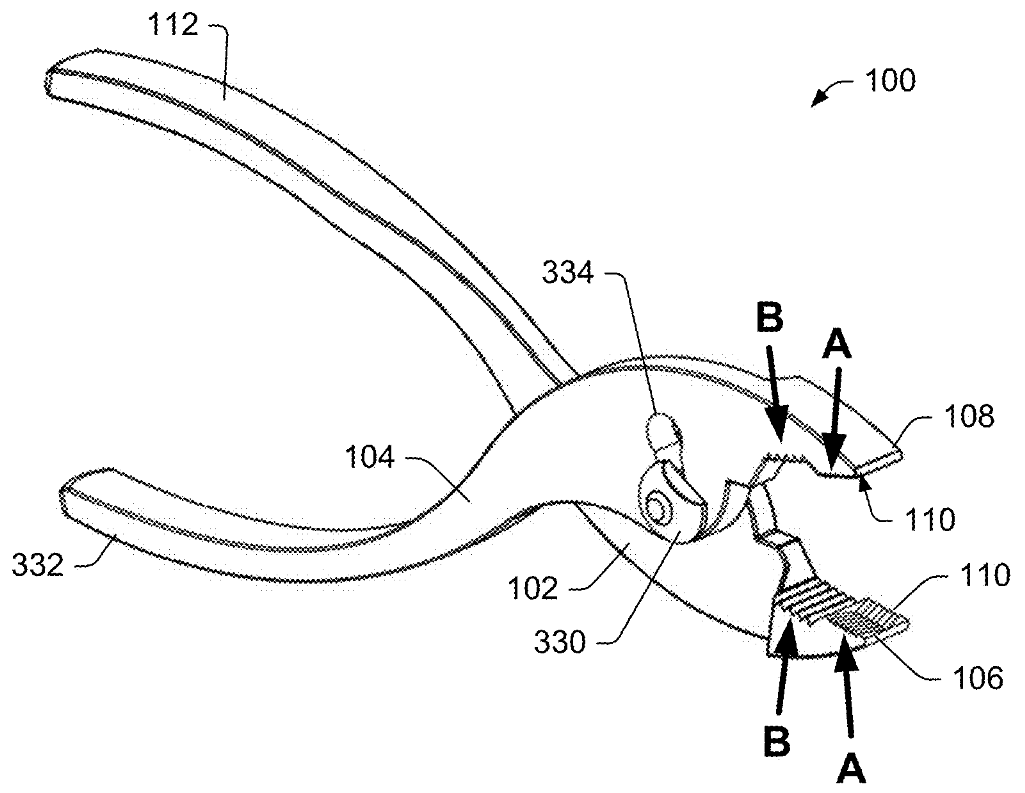
FIGS. 3-5 are perspective views of an example tool with chevron jaw, according to another embodiment.
Figure 4:
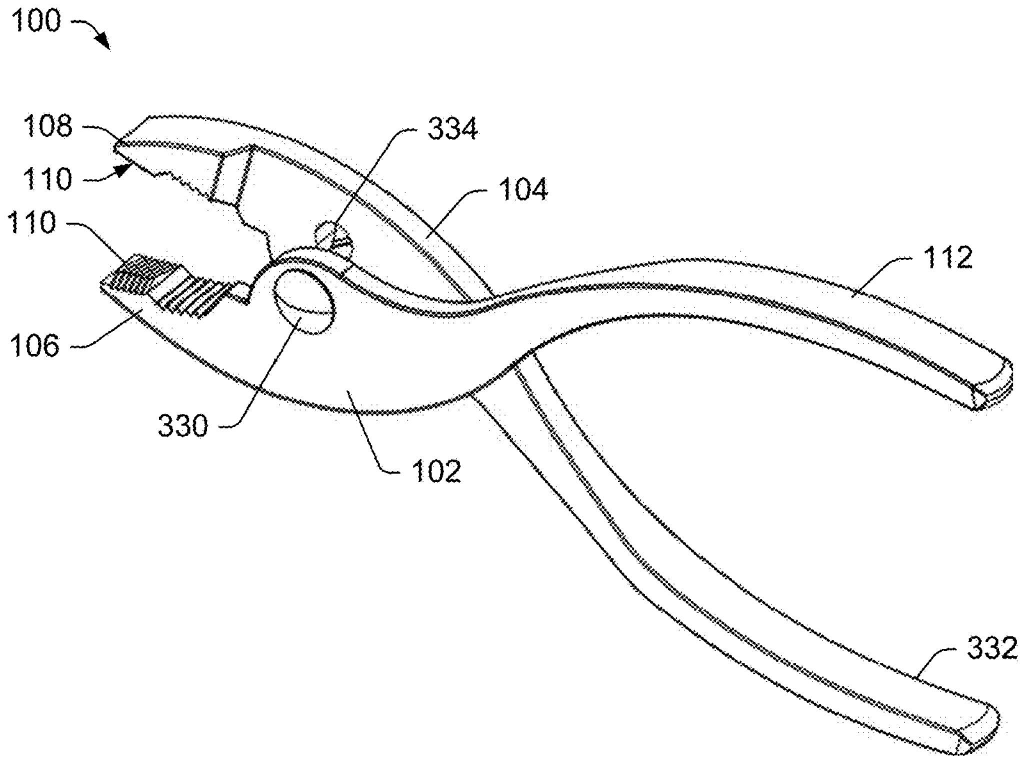
Figure 5:
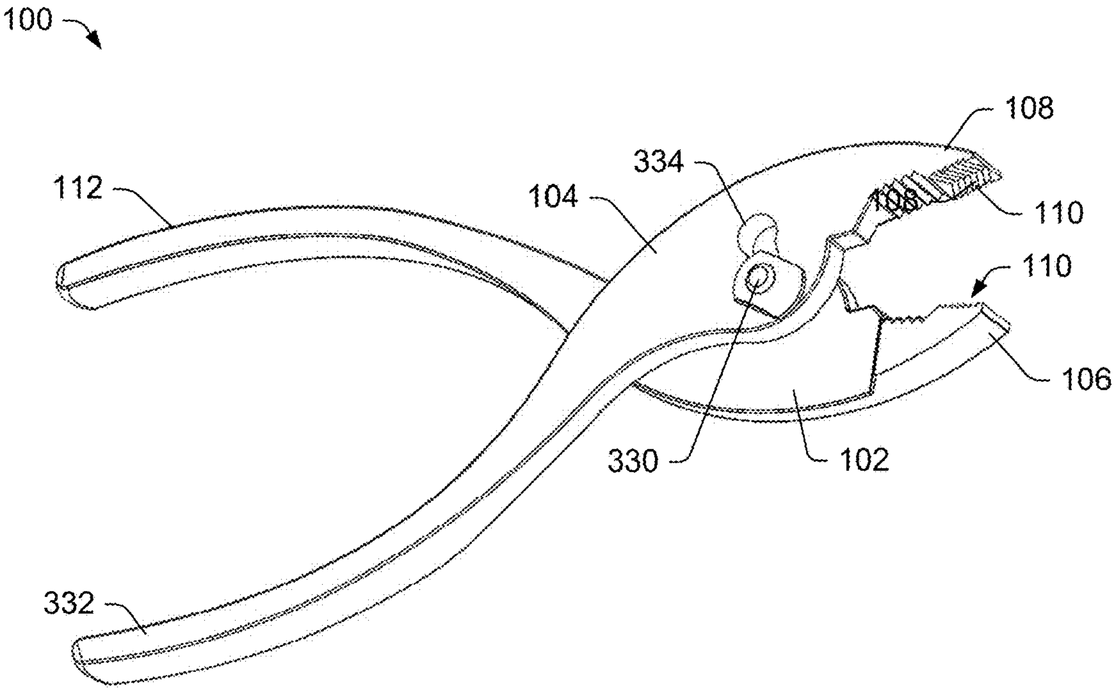

Referring to the example tool 100 of FIGS. 3-5 (e.g., slip-joint pliers), the tool body 102 includes a pin 330, which comprises a pivot point for the movable tool arm 104. For instance, the movable tool arm 104 is pivotally coupled to the tool body 102 using the pin 330. When the movable tool arm 104 pivots relative to the tool body 102, this brings the second tool jaw 108 closer to the first tool jaw 106 or further away from the first tool jaw 106, for precise gripping of the workpiece. Either one or both of the first (106) and second (108) tool jaws include a gripping surface 110 with a chevron pattern disposed thereon.

The movable tool arm 104 comprises a handle 332 coupled to or integral with the second tool jaw 108. An elongated opening 334 is disposed at the pivot point of the movable tool arm 104. The pin 330 of the tool body 102 is inserted through the elongated opening 334 of the movable tool arm 104. The elongated opening 334 of the movable tool arm 104 can be moved on the pin 330 to change the pivot point at the movable tool arm 104, and thereby change the range of sizes of workpieces that the tool 100 can grip. For instance, sliding the movable tool arm 104 so that the pin 330 is located at one end of the elongated opening 334 allows the tool 100 to grip larger workpieces than when the pin 330 is located at the other end of the elongated opening 334.

As shown at FIGS. 3-5, a tool 100 can have more than one gripping pattern (or gripping surface 110) on a single tool jaw (106, 108). In FIGS. 3-5, the tool 100 is shown with two gripping patterns (A and B) on each tool jaw 106 and 108. In various embodiments, each of the gripping patterns A and B on one or both of the tool jaws 106 and 108 may comprise a chevron pattern. In other embodiments, as shown at FIGS. 3-5, the gripping patterns A and B on one or both tool jaws 106 and 108 may be different, with one being a chevron pattern.

Figure 6:
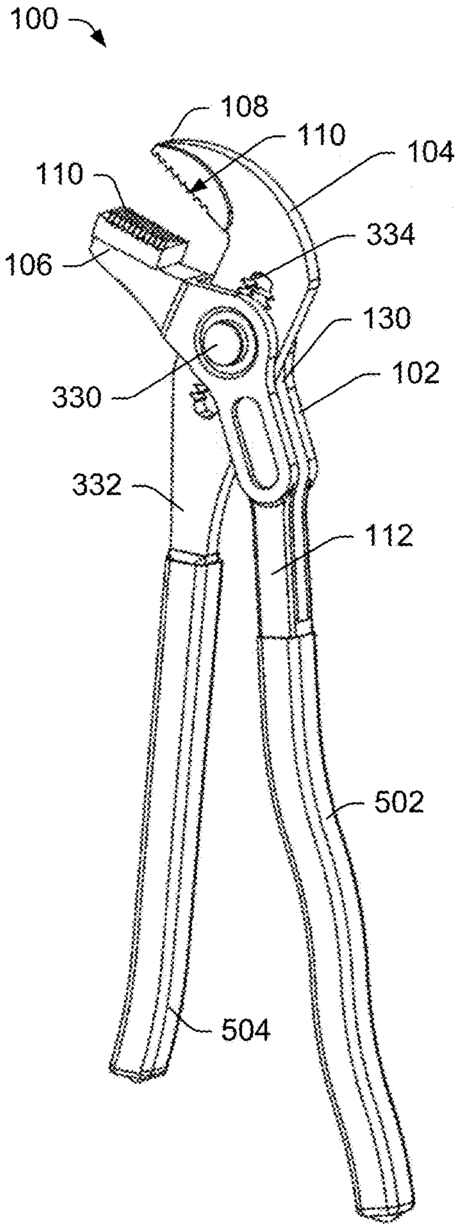
FIGS. 6 and 7 are perspective views of an example tool with chevron jaw, according to another embodiment.
Figure 7:
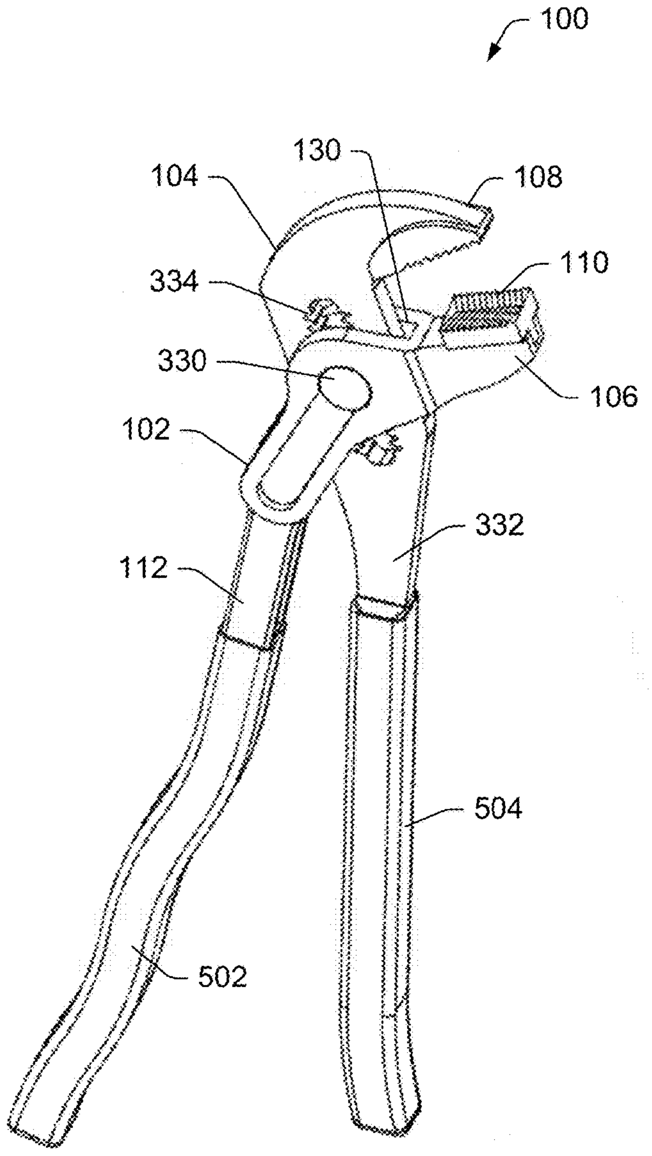

Referring to the example tool 100 of FIGS. 6 and 7 (e.g., slide-adjustable pliers), the tool body 102 includes a channel

130 for the movable tool arm 104 to slide through. The movable tool arm 104 can slide up or down within the channel 130 to adjust a position of the movable tool arm 104 within the channel 130. Moving the movable tool arm 104 within the channel 130 brings the second tool jaw 108 closer to the first tool jaw 106 or further away from the first tool jaw 106, for precise gripping of the workpiece. As described above, either one or both of the first (106) and second (108) tool jaws include a gripping surface 110 with a chevron pattern disposed thereon.

As also shown in FIGS. 6 and 7, the tool body 102 includes a pin 330, which comprises a pivot point for the movable tool arm 104. When the movable tool arm 104 pivots relative to the tool body 102, this also brings the second tool jaw 108 closer to the first tool jaw 106 or further away from the first tool jaw 106, for precise gripping of the workpiece. Moving the handle 332 toward the hand hold 112 of the tool body 102 pivots the movable tool arm 104 towards the tool body 102.

The movable tool arm 104 includes a handle 332 coupled to or integral with the second tool jaw 108. The example tool 100 of FIGS. 6 and 7 includes an added grip 502 on the hand hold 112 of the tool body 102, as well as an added grip 504 on the handle 332 of the movable tool arm 104.

There is an elongated opening 334 at the pivot point area of the movable tool arm 104, wherein the pin 330 of the tool body 102 is inserted through. The elongated opening 334 of the movable tool arm 104 can have multiple detents along a length of the elongated opening 334, for multiple pivot positions. The pin 330 can be moved throughout the multiple positions of the elongated opening 334 to change the pivot point of the movable tool arm 104, and thereby change the operating range of the tool 100. In other words, changing the pivot point of the movable tool arm 104 changes the range of sizes of workpieces that the tool 100 can grip. For instance, sliding the movable tool arm 104 so that the pin 330 is located at one end of the elongated opening 334 allows the tool 100 to grip larger workpieces than when the pin 330 is located at the other end of the elongated opening 334. Because the elongated opening 334 of the tool 100 has multiple pivot positions, the tool 100 is capable of working with workpieces having a wide range of sizes.

As described above, either one or both of the first (106) and second (108) tool jaws include a gripping surface 110 with a chevron pattern disposed thereon.

Figure 8:
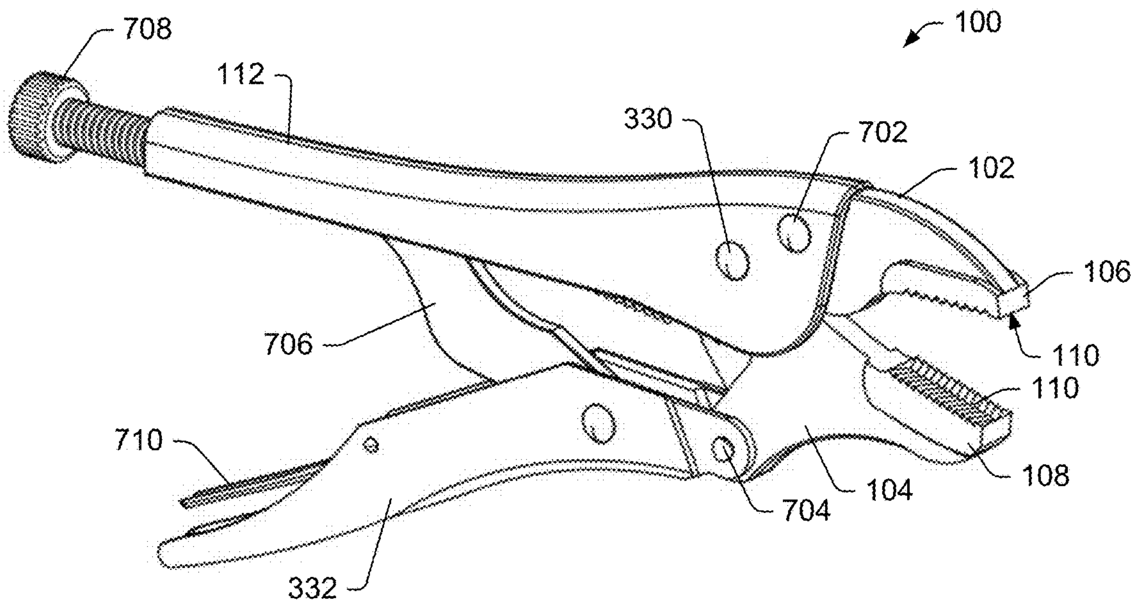
FIGS. 8-10 are perspective views of an example tool with chevron jaw, according to another embodiment.
Figure 9:
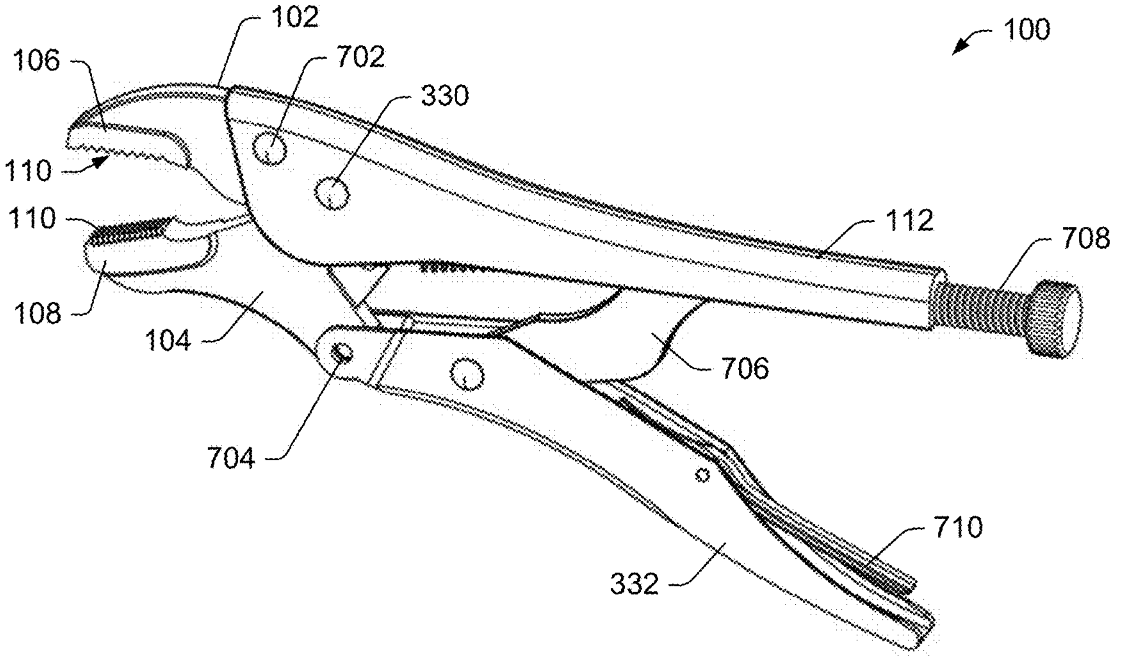
Figure 10:
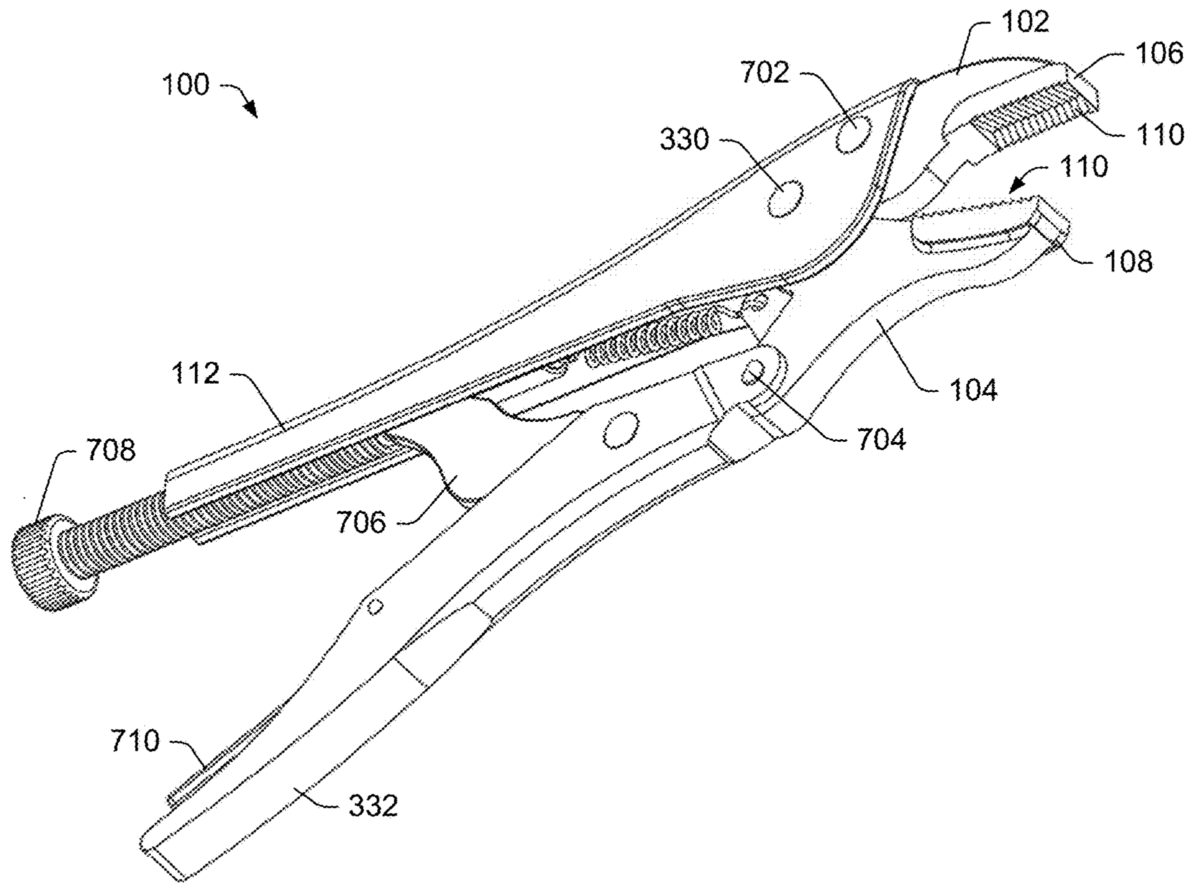

Referring to the example tool 100 of FIGS. 8-10 (e.g., locking pliers), the tool body 102 can be integral to or coupled to the hand hold 112. In the example shown at FIGS. 8-10, the tool body 102 is coupled to the hand hold 112 via a pin 702. The tool body 102 (and the hand hold 112) also includes a pin 330, which comprises a pivot point for the movable tool arm 104. The second tool jaw 108 is coupled to or integral with the movable tool arm 104. When the movable tool arm 104 pivots relative to the tool body 102, this brings the second tool jaw 108 closer to the first tool jaw 106 or further away from the first tool jaw 106, for precise gripping of the workpiece.

In the example shown, the movable tool arm 104 is also pivotally coupled to the handle 332 at pin 704. This allows the handle 332 to move the movable tool arm 104 in a clamping action, and to lock the movable tool arm 104 in place via a locking arm 706 and an adjustment screw 708. The locking arm 706 may be biased and work in combination with the adjustment screw 708. The movable tool arm 104 can be released from the locked position using a release lever 710.

Adjusting the adjustment screw 708 can change the range of sizes of workpieces that the tool 100 can grip. For instance, rotating the adjustment screw 708 in one direction allows the tool 100 to grip larger workpieces than when the adjustment screw 708 is turned the other direction. Turning the adjustment screw 708 also changes the compression pressure of the tool jaws (106, 108) on the workpiece clamped between them.

As described above, either one or both of the first (106) and second (108) tool jaws include a gripping surface 110 with a chevron pattern disposed thereon.

Figure 11:
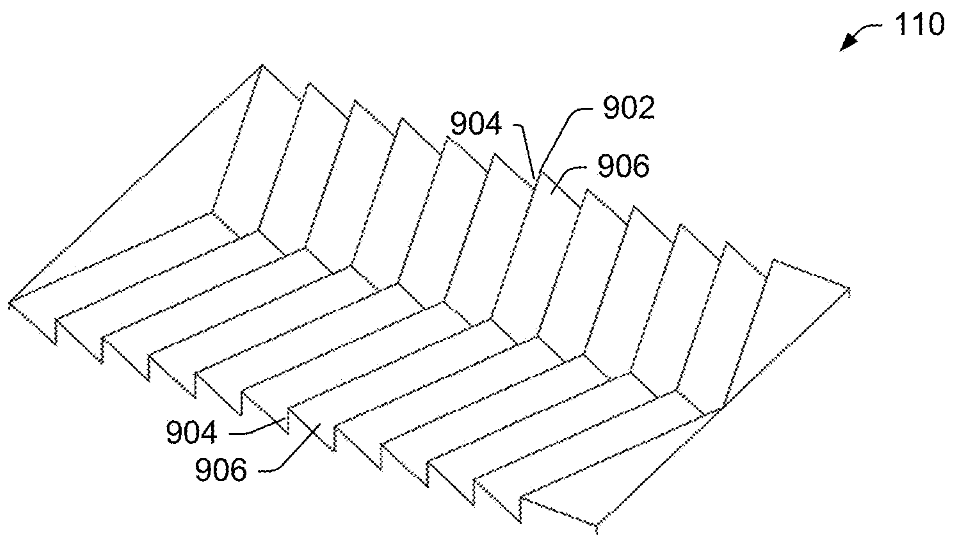
FIGS. 11 and 12 are perspective views of example chevron jaws, according to various embodiments.
Figure 12:
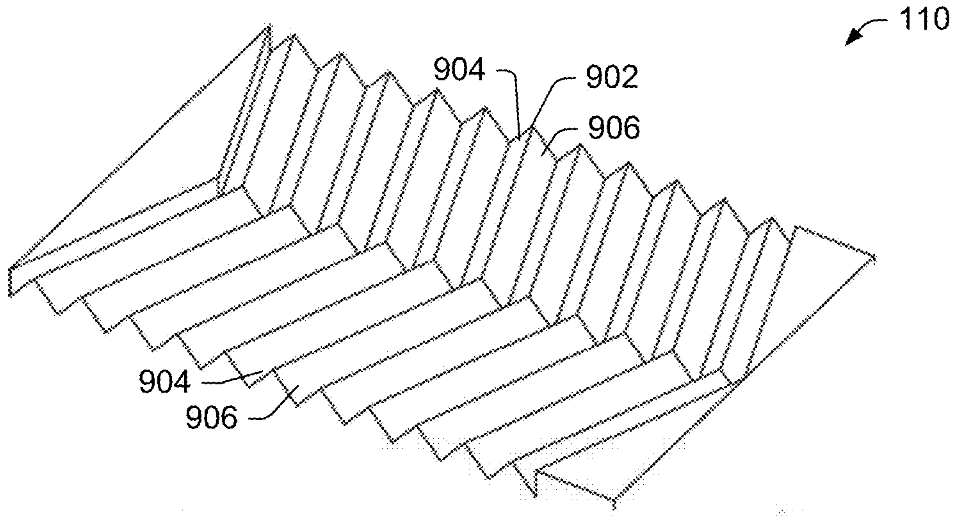

The gripping surface 110 of a tool jaw (106, 108) is configured with one or more features (such as teeth 902, for example) that are arranged to grip a workpiece. Examples of chevron patterns for the gripping surfaces 110 of various tool jaws (106, 108) are shown at FIGS. 11 and 12. The examples show the chevron arrangement of the teeth 902 (or like features) that comprise the gripping surfaces 110. The teeth 902 protrude from the gripping surface 110, and may have a pointed, rounded, blunt, truncated, or other profile that is configured to grip the workpiece.

As shown in the examples, the profile of the teeth 902 can be different in various embodiments. While two example profiles of teeth 902 are shown in the figures, many alternate profiles of chevron-arranged teeth 902 are contemplated. For instance, as shown at FIG. 11, the profile of the teeth 902 can be such that one side 904 of each tooth 902 is vertical and the other side 906 is angled. Alternately, one side 904 of each tooth 902 can be shorter in length than the other side 906 of the tooth.

In another example, as shown at FIG. 12, the profile of each tooth 902 can be such that both sides (904, 906) of each tooth are angled. In one example, the angle of each side (904, 906) of each tooth 902 is equal. Further, in the example, the length of each side (904, 906) of each tooth 902 is equal. In an alternate embodiment (not shown), The angles on the teeth 902 may vary across the length of the gripping surface 110. In such an embodiment, the profile of the teeth may not be constant, but may change over the length of the gripping surface 110.

The chevron pattern on the one or more gripping surfaces 110 can provide additional grip for the tool 100 when compared to conventional patterns. For example, the chevron arranged teeth 902 can provide the precision necessary for secure engagement with smooth or irregular surfaces. The chevron-arranged teeth 902 can also reduce tool 100 slipping while gripping a workpiece and provide a more consistent and reliable grip during use.

This discussion of exemplary advantages, features, and embodiments is illustrative only and is not intended to be limiting. Based on the disclosure, it will be understood that additional advantages are provided by aspects described herein. Alternative aspects that do not depart from its scope will become apparent to those skilled in the art. A skilled artisan may develop alternative means of implementing the aforementioned improvements without departing from the scope of the present disclosure.

Although various implementations and examples are discussed herein, further implementations and examples may be possible by combining the features and elements of individual implementations and examples.

It will be understood that certain features and sub combinations are of utility and may be employed without reference to other features and sub combinations and are contemplated within the scope of the claims.

The illustrations of FIGS. 1-12 are not intended to be limiting. In the various example embodiments illustrated in FIGS. 1-12, the location and position of the components, connections, and the like are for example only. Other locations and positions are contemplated and are within the scope of this disclosure. In some cases, additional or alternative components, techniques, sequences, or processes may be used to implement the techniques described herein.

CONCLUSION

While various discreet embodiments have been described throughout, the individual features of the various embodiments may be combined to form other embodiments not specifically described. The embodiments formed by combining the features of described embodiments are also within the scope of the disclosure.

What is claimed is:

1. A hand tool, comprising:

a rigid tool body with a hand hold;

a movable tool arm movably coupled to the tool body;

a first tool jaw integral with or coupled to the tool body, the first tool jaw having a first gripping surface; and a second tool jaw integral with or coupled to the movable tool arm, the second tool jaw having a second gripping surface, wherein the first gripping surface, the second gripping surface, or the first gripping surface and the second gripping surface has a chevron pattern formed from at least one projection extending from a first side of the respective jaw toward a central portion of the respective jaw and at least another projection extending from an opposing side of the respective jaw toward the central portion of the respective jaw, and inner ends of the at least one projection and the at least another projection being directly connected at the central portion of the respective jaw, and wherein each of the at least one projection and the at least another projection have a cross-sectional profile with a first side of the at least one projection and the at least another projection being vertical with respect to the gripping surface.

2. The hand tool of claim 1, wherein the tool body further includes a channel, and wherein the movable arm is arranged to slide within the channel.

3. The hand tool of claim 1, wherein sliding the movable tool arm relative to the tool body changes a distance between the first tool jaw and the second tool jaw.

4. The hand tool of claim 1, wherein pivoting the movable tool arm relative to the tool body changes a distance between the first tool jaw and the second tool jaw.

5. The hand tool of claim 1, wherein the tool body further comprises a pin, and wherein the pin comprises a pivot point for the movable tool arm.

6. The hand tool of claim 5, wherein the movable arm further comprises an elongated opening, and wherein the pin is configured to be inserted through the elongated opening.

7. The hand tool of claim 6, wherein changing a location of the pin relative to the elongated opening changes a distance between the first tool jaw and the second tool jaw.

8. The hand tool of claim 6, wherein changing a location of the pin relative to the elongated opening changes an operating range of the hand tool.

9. The hand tool of claim 1, wherein the movable arm further comprises a handle integral with or coupled to the second tool jaw.

10. The hand tool of claim 1, further comprising an adjustment nut movably coupled to the tool body and movably coupled to the movable tool arm, the adjustment nut arranged to move the movable tool arm relative to the tool body when rotated, and thereby arranged to move the second tool jaw relative to the first tool jaw.

11. The hand tool of claim 1, wherein the movable tool arm is pivotally coupled to the tool body, slidably coupled to the tool body, or a combination of pivotally coupled and slidably coupled to the tool body.

12. The hand tool of claim 1, wherein the first gripping surface, the second gripping surface, or the first gripping surface and the second gripping surface comprises a plurality of protruding features arranged in the chevron pattern.

13. A hand tool, comprising:

a rigid tool body with a hand hold, the tool body including a protruding pin;

a tool arm pivotally coupled to the tool body via the pin;

a first tool jaw integral with or coupled to the tool body, the first tool jaw having a first gripping surface; and a second tool jaw integral with or coupled to the tool arm, the second tool jaw having a second gripping surface, wherein the first gripping surface, the second gripping surface, or the first gripping surface and the second gripping surface has a chevron pattern formed from at least one projection extending from a first side of the respective jaw toward a central portion of the respective jaw and at least another projection extending from an opposing side of the respective jaw toward the central portion of the respective jaw, and inner ends of the at least one projection and the at least another projection being directly connected at the central portion of the respective jaw, and wherein each of the at least one projection and the at least another projection have a cross-sectional profile with a first side of the at least one projection and the at least another projection being vertical with respect to the gripping surface.

14. The hand tool of claim 13, wherein the tool arm further includes an elongated opening with multiple detents along a length of the elongated opening, the pin being disposed within the elongated opening, and wherein the pin is arranged to be moved into a detent of the multiple detents to determine or change a pivot point of tool arm.

15. The hand tool of claim 13, wherein the tool body also includes a channel, and wherein a portion of the tool arm is disposed within the channel, and wherein the tool arm is also slidably coupled to the tool body via the channel.

16. The hand tool of claim 13, wherein the first gripping surface, the second gripping surface, or the first gripping surface and the second gripping surface has a second gripping pattern in addition to and adjacent to the chevron pattern, the second gripping pattern comprising a plurality of protruding features arranged in a horizontal orientation from the first side of the respective jaw to the opposing side of the respective jaw.

17. A hand tool, comprising:

a rigid tool body with a hand hold, the tool body including a channel;

a tool arm slidably coupled to the tool body via the channel;

a first tool jaw integral with or coupled to the tool body, the first tool jaw having a first gripping surface; and a second tool jaw integral with or coupled to the tool arm, the second tool jaw having a second gripping surface, wherein the first gripping surface, the second gripping surface, or the first gripping surface and the second gripping surface has a chevron pattern formed from at least one projection extending from a first side of the respective jaw toward a central portion of the respective jaw and at least another projection extending from an opposing side of the respective jaw toward the central portion of the respective jaw, and inner ends of the at least one projection and the at least another projection being directly connected at the central portion of the respective jaw, and wherein each of the at least one projection and the at least another projection have a cross-sectional profile with a first side of the at least one projection and the at least another projection being vertical with respect to the gripping surface.

18. The hand tool of claim 17, further comprising an adjustment nut configured to adjust a position of the tool arm within the channel when rotated.

19. The hand tool of claim 17, wherein the tool body also includes a pin, and wherein the tool arm is also pivotally coupled to the tool body via the pin.

20. The hand tool of claim 17, wherein the first gripping surface, the second gripping surface, or the first gripping surface and the second gripping surface comprises a plurality of protruding teeth arranged in the chevron pattern.

* * * * *